(12) United States Patent
Ayhan et al.

(10) Patent No.: US 11,774,549 B2
(45) Date of Patent: Oct. 3, 2023

(54) MOBILE PART HAVING AT LEAST ONE MODULE, AND METHOD FOR OPERATING A MOBILE PART

(71) Applicant: SEW-EURODRIVE GMBH & CO. KG, Bruchsal (DE)

(72) Inventors: Serdal Ayhan, Dielheim (DE); Thomas Schäfer, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 215 days.

(21) Appl. No.: 16/963,484

(22) PCT Filed: Dec. 13, 2018

(86) PCT No.: PCT/EP2018/025320
§ 371 (c)(1),
(2) Date: Jul. 20, 2020

(87) PCT Pub. No.: WO2019/141340
PCT Pub. Date: Jul. 25, 2019

(65) Prior Publication Data
US 2021/0048509 A1    Feb. 18, 2021

(30) Foreign Application Priority Data
Jan. 18, 2018   (DE) ..................... 10 2018 000 366.4

(51) Int. Cl.
*G01S 7/06* (2006.01)
*B60Q 1/00* (2006.01)
(Continued)

(52) U.S. Cl.
CPC ............ *G01S 7/062* (2013.01); *B60Q 1/0023* (2013.01); *B60Q 1/0041* (2013.01); *B60Q 1/02* (2013.01);
(Continued)

(58) Field of Classification Search
CPC ........ G01S 7/062; G01S 13/931; G01S 7/027; G01S 13/87; G01S 2013/9327;
(Continued)

(56) References Cited

U.S. PATENT DOCUMENTS

| | | | |
|---|---|---|---|
| 5,023,790 A | 6/1991 | Luke, Jr. | |
| 9,097,800 B1 * | 8/2015 | Zhu | ........................ G01S 13/931 |

(Continued)

FOREIGN PATENT DOCUMENTS

| | | | | |
|---|---|---|---|---|
| CN | 103129572 A | * | 6/2013 | ............. B61D 17/02 |
| CN | 107458300 A | | 12/2017 | |

(Continued)

OTHER PUBLICATIONS

G. Singh, E. R. Collins, S. K. Rönnberg, E. O. A. Larsson and M. H. J. Bollen, "Impact of high frequency conducted voltage disturbances on LED driver circuits, " 2017 IEEE Power & Energy Society General Meeting, 2017, pp. 1-5, doi: 10.1109/PESGM.2017. 8274378. (Year: 2017).*

(Continued)

*Primary Examiner* — Vladimir Magloire
*Assistant Examiner* — Yonghong Li
(74) *Attorney, Agent, or Firm* — CARTER, DELUCA & FARRELL LLP

(57) ABSTRACT

In a mobile part having at least one module, and a method for operating a mobile part, the mobile part is able to be moved on a driving surface, and the module includes a controllable illumination device. The illumination device is provided and/or situated in elongated form along a planar curve, in particular, a line.

22 Claims, 1 Drawing Sheet

(51) Int. Cl.
*B60Q 1/02* (2006.01)
*G01S 13/931* (2020.01)
*B60Q 1/50* (2006.01)
*G01S 7/02* (2006.01)

(52) U.S. Cl.
CPC ............ *B60Q 1/525* (2013.01); *G01S 13/931* (2013.01); *G01S 7/027* (2021.05)

(58) Field of Classification Search
CPC ....... G01S 7/04; B60Q 1/0023; B60Q 1/0041; B60Q 1/02; B60Q 1/46; B60Q 1/525; B60Q 9/007; B60Q 1/00; F21S 41/141; F21S 43/14; G05D 1/021; G08G 1/00
See application file for complete search history.

(56) References Cited

U.S. PATENT DOCUMENTS

| | | | |
|---|---|---|---|
| 9,508,235 B2 * | 11/2016 | Suessemilch | B25J 9/1674 |
| 9,701,239 B2 * | 7/2017 | Kentley | G05D 1/0214 |
| 9,764,900 B2 * | 9/2017 | Grosse | B60L 5/40 |
| 9,809,149 B2 * | 11/2017 | Cho | F21S 43/19 |
| 2004/0160334 A1 * | 8/2004 | Pederson | F21K 9/00 |
| | | | 340/815.45 |
| 2005/0013140 A1 | 1/2005 | Currie | |
| 2013/0226344 A1 | 8/2013 | Wong et al. | |
| 2015/0091471 A1 | 4/2015 | Shan | |
| 2017/0080850 A1 | 3/2017 | Drexler et al. | |
| 2017/0082751 A1 | 3/2017 | Maisonnier et al. | |
| 2017/0120803 A1 | 5/2017 | Kentley et al. | |

FOREIGN PATENT DOCUMENTS

| | | | | |
|---|---|---|---|---|
| CN | 207184920 U | * | 4/2018 | |
| DE | 102007042625 A1 | | 3/2009 | |
| DE | 102011108579 A1 | | 1/2013 | |
| DE | 102011109532 A1 | | 2/2013 | |
| DE | 102011110196 A1 | * | 2/2013 | ............ B62D 1/283 |
| DE | 102011110196 A1 | | 2/2013 | |
| DE | 102013215409 A1 | | 2/2015 | |
| EP | 3267098 A1 | | 1/2018 | |
| JP | 2016219258 A | * | 12/2016 | |
| WO | 2001098708 A1 | | 12/2001 | |
| WO | 2014114430 A1 | | 7/2014 | |
| WO | 2015090656 A1 | | 6/2015 | |
| WO | 2015180978 A1 | | 12/2015 | |

OTHER PUBLICATIONS

CN_103129572_A_I_translate.pdf (translate of CN-103129572-A) (Year: 2013).*
"Discover OTTO: The SDV Designed for Material Handling", Clearpath, YouTube Video, Dec. 20, 2016, 2 pages.
SEW Eurodrive, Betriebsanleitung, Maxolution Systemlösung Fahrerlose Transportsysteme, Dec. 2017, 1 page.
Husqvarna Automower 230 ACX 220 AC Operator's Manual, Husqvarna AB, Original Instructions, 2010, 77 pages.
European Office Action issued in corresponding EP Patent Application No. 18833391.8, dated Aug. 3, 2023, with English translation.

* cited by examiner

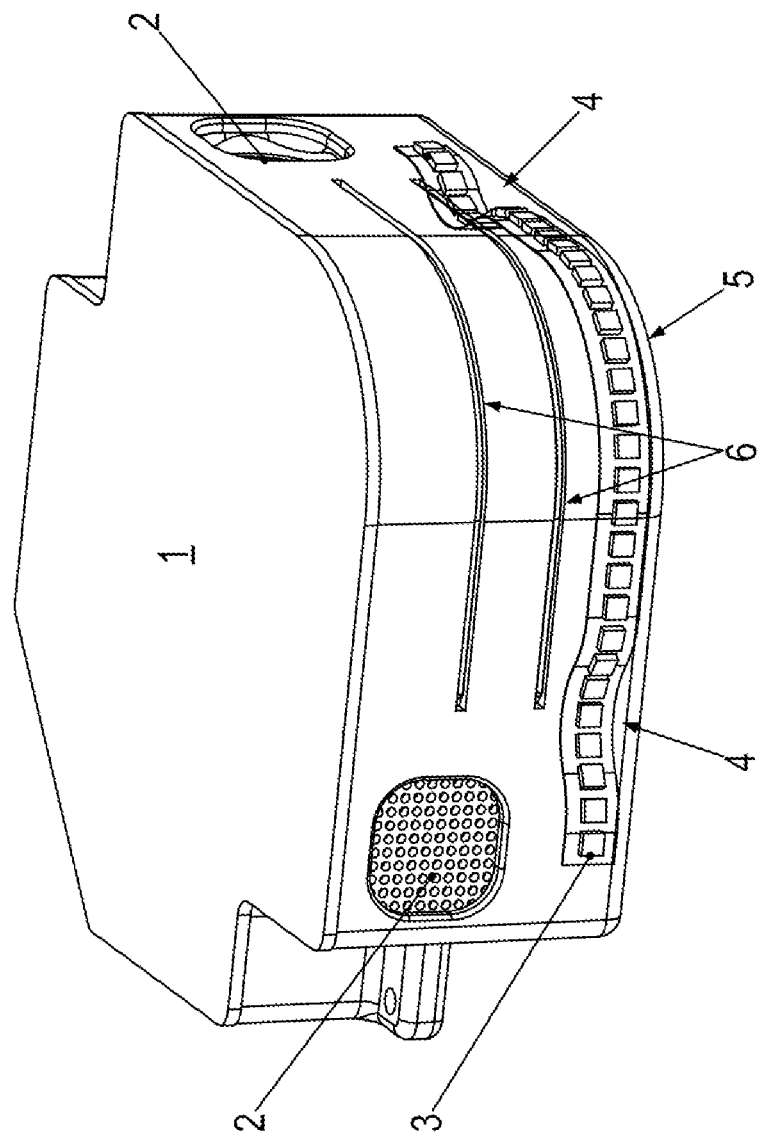

MOBILE PART HAVING AT LEAST ONE MODULE, AND METHOD FOR OPERATING A MOBILE PART

FIELD OF THE INVENTION

The present invention relates to a mobile part having at least one module, and to a method for operating a mobile part.

BACKGROUND INFORMATION

In certain conventional systems, it is possible to position a mobile part on a driving surface so that it is able to move.

In this context, a vehicle having lights on the side is described in U.S. Patent Application Publication No. 2005/0013140.

U.S. Pat. No. 5,023,790 describes an automatically guided mobile part.

German Patent Document No. 10 2011 109 532 describes a method for operating a system having a mobile part, which transmits energy to a machine.

German Patent Document No. 10 2013 215 409 describes a projection unit for a mobile part.

German Patent Document No. 10 2011 110 196 describes a mobile part having a drive.

SUMMARY

Example embodiments of the present invention provide a mobile part for which the safety is to be increased at a minimal additional outlay.

According to an example embodiment of the present invention, a mobile part includes at least one module, in particular, the mobile part is able to be moved on a driving surface, the module has a controllable illumination device, in particular an LED band, in particular, the illumination device is arranged and/or positioned in elongated form along a planar curve, in particular line, in particular, the illumination device has LEDs situated along the curve, in particular at regular intervals from one another.

This offers the advantage that the illumination device is disposed in a module. It is therefore also possible to place radar sensors and a further illumination device inside the module, with the further illumination device illuminating the driving surface from the direction of the interior space region of the module through slots. With the aid of the sensors, the distance to an object is able to be detected and the illumination device is thus controllable by a control disposed on the mobile part, in particular as a function of the distance from the detected object.

According to example embodiments, the module is connected to the rest of the mobile part with the aid of screws, i.e., in particular to a frame of the mobile part. For example, a plug connection is provided, which has a plug connector part and a mating plug connector part for the electrical connection of the module to the rest of the mobile part, especially its control. In particular, the plug connector part is situated on the module and the mating plug connector part on the remaining mobile part, in particular on the frame of the mobile part.

The sensor signals from the sensors are thus conveyed via the plug connection to a control of the mobile part, which is fixed in place on the frame of the mobile part, in particular.

The control uses these sensor signals to determine actuation signals for the control of the illumination device.

This makes it possible to control the color, the hue, and/or the flashing frequency of the light emitted by the illumination device. The flashing frequency is the frequency of the flashing, i.e., the activation with the subsequent deactivation.

Modules of the same type are able to be placed on four outer corners of the mobile part such that all-around monitoring is possible with the aid of the sensors, and also signaling, in particular a display, which is visible from all angles, using the respective illumination device of the modules. The all-around monitoring relates to a plane extending in parallel with the driving surface of the system set apart from the driving surface and includes at least one point of the module or extends through the radar sensors and/or through the illumination device. The angles at circumference relate to a direction in this plane, e.g., the driving direction of the mobile part or a direction parallel to a wheel axle.

According to example embodiments, the module is situated on the mobile part, in particular is connected to it by screws, such that the projection of the mobile part perpendicular onto the driving surface has the module at its outer frame, in particular in a corner region of the projection. This offers the advantage that the module is able to be mounted on an outer corner of the mobile part and thereby allows for uncomplicated all-around monitoring and signaling. In particular, the outer corner slightly projects so that unobstructed monitoring of the sensitive region of the radar sensor of the module is possible.

According to example embodiments, the module is connected to a frame of the mobile part with the aid of screws, in particular, the module is electrically supplied from an energy accumulator of the mobile part with the aid of a plug connection. This offers the advantage that a reversible mechanical and electrical interface is achievable, which is easy to operate.

According to example embodiments, the surface of the module includes a convex region, which is situated between two concave regions, in particular depressions, which are set apart from each other. This offers the advantage that an outwardly-projecting region is formed by the module at which the illumination device thus is able to introduce light into an enlarged angle of circumference region.

According to example embodiments, the illumination device is situated on the module, in particular on the surface of the module, the illumination device being arranged in elongated form along a planar curve, or the planar curve, in particular line, the line being aligned in parallel with, and particularly set apart from, the driving surface and/or the particular plane that encompasses the rotational axes of the wheels of the mobile part, in particular, a first region of the illumination device and/or the curve being situated in the convex region, in particular, a second region of the illumination device and/or the curve being situated in one of the concave regions, in particular, a third region of the illumination device and/or the curve being situated in one of the concave regions. This has the advantage that the illumination device is able to be provided in the form of a band and thus occupies an elongated surface region of the module. In this manner, a large angle at circumference region is able to be irradiated with light from the direction of the convex region. Because of the concave regions, the illumination device is able to emit light from this direction also into a circumferential direction already irradiated from the direction of the concave region.

According to example embodiments, the module is situated in an outer corner region of a frame of the mobile part.

For example, this makes it possible to carry out simple all-around monitoring provided additional modules are also situated in further outer corner regions of the mobile part. The outer corner regions are, for example, the regions that are situated at the greatest distance from the center of mass of the mobile part.

According to example embodiments, the module functions as a rounded outer corner region of the perpendicular projection of the mobile part including the module onto the driving surface. This is considered advantageous insofar as it allows for all-around monitoring provided further modules are also situated in additional outer corner regions of the mobile part. The outer corner regions are, for example, the regions that are situated at the greatest distance from the center of mass of the mobile part.

According to example embodiments, additional modules having a similar or identical configuration as the module are disposed on the mobile part, these modules being situated in an outer corner region of a frame of the mobile part in each case, and/or the modules functioning as a respective rounded outer corner region of the projection of the mobile part including the module perpendicular onto the driving surface in each case.

This has the advantage that all-around monitoring is achievable provided the additional modules are also situated on further outer corner regions of the mobile part. The outer corner regions are, for example, the regions that are situated at the greatest distance from the center of mass of the mobile part in each case.

According to example embodiments, the module, or each module, has at least one radar sensor, in particular, which monitors a respective space region and/or by which the distance of objects from the radar sensor is able to be determined. This is considered advantageous insofar as it allows for a distance determination of a respective object.

According to example embodiments, the additional modules are placed such that the mobile part has all-around monitoring, and/or the entire angle at circumference region in relation to a center point situated in the mobile part in a plane extending in parallel with the driving surface is able to be monitored with the aid of the radar sensors. This makes it possible to achieve greater safety.

According to example embodiments, the concave regions are arranged as depressions on the surface of the module, in particular, the depressions relating to a plane that is aligned in parallel with the driving surface. This is considered advantageous insofar as the depressions are readily able to be produced.

According to example embodiments, the housing of the module has uninterrupted slots, in particular, the slots being aligned in parallel with the driving surface. This offers the advantage that the driving surface is able to be illuminated by a further illumination device, which is situated in the interior space of the module.

According to example embodiments, a further illumination device is situated in the interior space region of the module surrounded by the housing of the module, in particular, such that the light generated by the further illumination device emerges via the slots in the direction of the driving surface. This is considered advantageous insofar as an uncomplicated illumination is able to be achieved.

According to an example embodiment of the present invention, a method is provided for operating a mobile part, with the hue, the color, and/or a flashing frequency of the light emitted by an illumination device of the mobile part being controlled as a function of the detected distance of an object from the mobile part. This offers the advantage that a display of the distance, and thus of the magnitude of the collision risk, is able to be indicated.

For the data transmission, the illumination device is particularly controlled using a clock pulse frequency that is greater than 500 Hertz. This modulation of the emitted visible light is therefore not detectable by the human eye.

For example, the flashing frequency is less than 10 Hertz, thereby making is perceivable to the human eye.

With a decreasing flashing frequency, the clock pulse frequency is, for example, increased accordingly, in particular proportionally. It is therefore still possible to maintain the same average data rate when the emergency case occurs, that is to say, when an object approaches.

According to example embodiments, the hue is controlled from red via orange and then via yellow to green when the distance decreases from a first value to a second value. This offers the advantage that the distance is able to be indicated in a color-coded manner. In addition and/or as an alternative, the number of LEDs is controllable as a function of the distance.

According to an example embodiment of the present invention, a system has a driving surface and a mobile part, with the driving surface being a plane. This offers the advantage that the vehicle is able to be moved at a low energy input. The plane is, for example, a horizontal plane so that the mobile part is movable with a low energy input by its drive actuated by its control, in particular in the driving direction induced by a steering unit actuated by its control, the driving direction corresponding to a steering angle, in particular.

Further features and aspects of example embodiments of the present invention are described in greater detail below with reference to the appended FIGURE.

BRIEF DESCRIPTION OF THE DRAWING

FIG. 1 schematically illustrates a module 1 which is situated on a mobile part according to an example embodiment of the present invention.

DETAILED DESCRIPTION

The mobile part is arranged as a vehicle, which has wheels and a steering unit.

The mobile part is movably situated on a driving surface of a system such as a warehouse, a high rack warehouse, a production facility, etc. The wheels are rotatably mounted on the frame of the mobile part. For example, swivel caster units which have at least one rotatably mounted wheel, especially a caster, are provided for this purpose. The respective swivel caster unit itself is mounted on the frame in a manner that allows it to rotate about a respective rotational axis which is oriented in the normal direction with respect to the driving surface of the mobile part. In contrast, the rotational axis of each wheel is aligned perpendicular thereto, or in other words, in parallel with the driving surface. The weight force of the mobile part and the load it accommodates is largely transferred via the wheels to the driving surface.

The steering unit has, for example, a drive unit, which is situated on the frame of the mobile part in a manner that allows a rotation about a first rotational axis. The first rotational axis is again aligned in parallel with the normal direction of the driving surface.

The drive unit is equipped with an electric motor, which drives wheels of the drive unit either directly or via a gear unit, i.e., indirectly. Since the drive unit is pressed against the driving surface by the frame only with the aid of a spring element, the weight force of the frame together with the load accommodated on the frame is substantially able to be conducted to the driving surface via the wheels rotatably mounted on the frame, that is to say, via the steering caster unit, in particular. The steering unit, on the other hand, is pressed against the driving surface only by its own weight force and the force generated by the spring element.

The wheels of the drive unit are thus pressed against the driving surface with a force that is independent of the accommodated load.

The projection surface of the mobile part perpendicularly projected onto the driving surface has a rectangular outline with rounded corner regions.

In particular, a module 1, which includes an illumination device 3 which is situated along a line extending on the surface of module 1, is disposed on a respective outer corner region of the mobile part in each case. The line is situated in a plane that is aligned in parallel with the driving surface. The line has concave regions between which a convex region is situated. The line thus has a serpentine extension. As a result, illumination device 3 emits light in as many angular directions as possible and in the process achieves the most uniform illumination in the entire angle at circumference region it covers. This is so because on account of the concave curvature, illumination device 3 emits light into the space region irradiated by the convex region also in a region that is set apart from the convex region. In contrast to a merely rounded corner, i.e., a purely convex region, in the case of illumination device 3 described herein, the space area illuminated by the convex region is also illuminated by further regions that are set apart from the convex region in each case.

The line is, for example, situated in the lower end region, i.e., in the end region of the module facing the driving surface.

In addition, sensors 2, which are, for example, arranged as radar sensors, are situated on the side facing away from illumination device 3.

The radar sensors function as distance sensors for detecting obstacles or approaching objects. This makes it possible for the control of the mobile part to reduce the driving speed, in particular to stop the driving movement, if a collision risk is detected.

Illumination device 3 includes, for example, light sources which are set apart from one another, e.g., at regular intervals, along the line. Controllable light sources such as LEDs are, for example, used as light sources. More specifically, illumination device 3 is arranged as an LED band, with LEDs particularly being situated next to one another in the band direction. The color and/or intensity, in particular the luminosity, of the light emitted by illumination device 3 is/are controllable, in particular by the control of the mobile part. As a result, the distance of at least one of the radar sensors is able to be indicated in a color-coded or intensity-coded manner.

Since an individual module 1 is situated on all outer corners of the mobile part, in particular on all four outer corners, it is possible to carry out all-around monitoring, in particular in parallel with the driving surface.

For example, with a steadily decreasing distance from the detected object, illumination device 3 radiates light of a hue that transitions from green via yellow and then orange to red. For instance, the green hue is used at a distance of one meter, and yellow or orange is used at shorter distances, and red with a vanishing distance.

In addition, a flashing operation of illumination device 3 is also able to be carried out, with the flashing frequency being a function of the detected distance in each case.

Module 1 has two slots, which extend in parallel with each other, pass through the housing of module 1 and extend in parallel with the driving surface and illumination device 3.

It is therefore possible to place a further illumination device in the interior region of module 1 surrounded by the housing, whose emitted light emerges through slots 6 into the surrounding area where it may be used for illumination or for indicating a status or information. For example, the region of the driving surface adjacent to the mobile part is illuminated.

The concave regions, directed in parallel with the driving surface, are arranged in the form of depressions 4 on the module.

In additional exemplary embodiments, a number of LEDs of illumination device 3 are actuated using a red hue, with the number depending on the distance of the detected object. The remaining LEDs of illumination device 3 are either green or not actuated. The number of LEDs actuated in red is, for example, proportional to the distance. As an alternative, the number increases with a decreasing distance and reaches its maximum at a minimum value. Moreover, the hue is shifted to red as well, so that the maximum number of LEDS radiating red is provided at the minimum value, in particular with a vanishing distance.

LIST OF REFERENCE NUMERALS

1 module
2 sensor
3 illumination device
4 depression
5 rounded corner area
6 slot

The invention claimed is:

1. A mobile part, comprising:
at least one module including a controllable illumination device arranged and/or positioned in elongated form along a planar curve having two concavely curved regions that are set apart from each other and a convexly curved region arranged between the two concavely curved regions, the illumination device including light sources arranged along the concavely curved regions and the convexly curved region.

2. The mobile part according to claim 1, wherein the mobile part is movable on a driving surface.

3. The mobile part according to claim 1, wherein the illumination device includes an LED band.

4. The mobile part according to claim 1, wherein the light sources include LEDs arranged at regular intervals from one another.

5. The mobile part according to claim 1, wherein the module is arranged on and/or screw-connected to the mobile part, the mobile part being movable on a driving surface, a projection of the mobile part perpendicular to the driving surface having the module at an outer frame and/or in a corner region of the projection.

6. The mobile part according to claim 1, wherein the module is connected and/or screw-connected to a frame of the mobile part, the module is electrically suppliable from an energy accumulator of the mobile part via a plug connection, and/or a surface of the module includes a convex region arranged between two concave regions and/or depressions that are set apart from each other.

7. The mobile part according to claim 6, wherein a first region of (a) the illumination device and/or (b) a curve along which the illumination device is arranged is arranged in the convex region, a second region of (a) the illumination device and/or (b) the curve is arranged in one of the concave regions, and a third region of (a) the illumination device and/or (b) the curve is in one of the concave regions.

8. The mobile part according to claim 6, wherein the concave regions are arranged as depressions on the surface of the module and/or the depression relate to a plane that is aligned in parallel with a driving surface.

9. The mobile part according to claim 1, wherein the illumination device is provided on the module and/or on a surface of the module, the illumination device is arranged elongated form along a curve, or a planar curve, and/or a line aligned in parallel with and/or set apart from a driving surface and/or a plane that encompasses rotational axes of wheels of the mobile part.

10. The mobile part according to claim 1, wherein the module is arranged in an outer corner region of a frame of the mobile part and/or the module is arranged as a rounded outer corner region of a projection of the mobile part that includes the module perpendicular to a driving surface.

11. The mobile part according to claim 1, wherein additional modules having a similar and/or identical configuration as the module are provided on the mobile part, the additional modules being arranged on an outer corner region of a frame of the mobile part and/or arranged as a respective rounded outer corner region of a projection of the mobile part including the module perpendicular to a driving surface.

12. The mobile part according to claim 11, wherein the additional modules are arranged to provide all-around monitoring and/or radar sensors of the additional modules are adapted to monitor an entire angle at circumference region in relation to a center point situated in the mobile part in a plane extending in parallel with a driving surface.

13. The mobile part according to claim 1, wherein the module includes at least one radar sensor.

14. The mobile part according to claim 13, wherein the radar sensor is adapted to monitor a space region and/or determine a distance of objects from the radar sensor.

15. The mobile part according to claim 1, a housing of the module includes uninterrupted slots aligned in parallel with a driving surface.

16. The mobile part according to claim 15, wherein a further illumination device is arranged in an interior space region of the module surrounded by a housing and is adapted to generate light that emerges via the slots in a direction of the driving surface.

17. A method for operating a mobile part as recited in claim 1, comprising:
actuating the illumination device at a clock pulse frequency that is greater than 500 Hertz; and
controlling a hue, a color and/or a flashing frequency of light emitted by the illumination device as a function of a detected distance of an object from the mobile part;
wherein the clock pulse frequency is increased with a decreasing flashing frequency.

18. The method according to claim 17, wherein the flashing frequency is less than 10 Hertz.

19. The method according to claim 17, wherein the clock pulse frequency is increased proportionally with the decreasing flashing frequency.

20. The method according to claim 17, wherein the hue is controlled from red via orange and then via yellow to green with decreasing distance decreases from a first value to a second value, and/or the illumination device has a plurality of LEDs, a number of the LEDs being controlled as a function of the sensed distance of the object.

21. A system, comprising:
a planar driving surface and a mobile part as recited in claim 16.

22. A mobile part movable on a driving surface, comprising:
at least one module including a controllable illumination device arranged as an LED band, the illumination device arranged and/or positioned in elongated form along a planar curve having two concavely curved regions that are set apart from each other and a convexly curved region arranged between the two concavely curved regions, the illumination device including LEDs arranged along the concavely curved regions and along the convexly curved region at regular intervals from one another, the module being positioned on the mobile part such that a projection of the mobile part perpendicular onto the driving surface has the module at an outer frame and/or on a corner region of the projection, the module being screw-connected to a frame of the mobile part, the module being electrically suppliable from an energy accumulator of the mobile part via a plug connection; and
further modules provided on the mobile part and having a similar and/or identical configuration as the module, the additional module being arranged in an outer corner region of the frame of the mobile part and/or being arranged as a respective rounded outer corner region of the projection of the mobile part including the module perpendicular onto the driving surface;
wherein in each module includes at least one radar sensor adapted for all-around monitoring, a housing of the module includes uninterrupted slots aligned in parallel with the driving surface, and a further illumination device is arranged in an interior space region of the module surrounded by the housing of the module, so that light generated by the further illumination device emerges via the slots in a direction of the driving surface.

* * * * *